3,247,138
ONE-PACKAGE LIQUID POLYSULFIDE SEALANT
Joseph S. Jorczak, Newtown, and Albert W. Volk, Drexel Hill, Pa., assignors to Thiokol Chemical Corporation, Bristol, Pa., a corporation of Delaware
No Drawing. Filed June 6, 1962, Ser. No. 200,336
6 Claims. (Cl. 260—18)

This invention relates to coating and sealing compositions based on polysulfide polymers, and more particularly to a novel one-package coating and sealing composition that will remain stable in storage for an indefinite period of time and yet will be readily curable after application to the surfaces to be treated to form an elastomer having good physical and chemical properties.

It is known that certain compositions based on liquid polysulfide polymers can be used with advantage for a wide variety of coating and sealing applications. Liquid polysulfide polymers, when mixed with suitable curing agents under suitable conditions, form elastomers having excellent resistance to acids, alkalis, petroleum hydrocarbons and atmospheric oxidation. Moreover, the cured elastomeric compositions adhere well to metals, glass, cement and other plastics. Hence they have been extensively used for a variety of coating, caulking and grouting applications, e.g., sealing panes of glass to metal window frames, paving highway bridges, repairing cracks in concrete structures, caulking boat hulls and the like.

The polysulfide polymers used as a base for such compositions can be prepared as described in U.S. Patent 2,466,963. As disclosed in this patent, solid relatively high molecular weight polysulfide polymers are formed which are subsequently split to produce liquid polythiopolymercaptans having molecular weights of the order of 500 to 25,000. In general, the high molecular weight solid polymers are prepared by reacting polyfunctional organic compounds with alkali metal or alkaline earth metal polysulfide solutions to produce high molecular weight polymers having a recurring unit (RSS) wherein "R" is usually a divalent organic radical that may vary widely in its specific structure and SS represents a disulfide linkage through which the organic radicals are interconnected. In order to improve the properties of the polymers, it is customary to use a mixture of difunctional and trifunctional organic compounds wherein the trifunctional compound is present in a relatively small amount to produce a slightly cross-linked structure.

Although the organic radicals represented by the symbol "R" above may vary considerably in their specific structure, the commercially important polymers are usually made from certain aliphatic halides, e.g. alkylene chlorides such as ethylene dichloride and its homologues or oxygen-containing aliphatic dichlorides such as bis(betachloroethyl) formal. Thus most of the commercial polymers are primarily composed of relatively short chain divalent alkylene and/or oxahydrocarbon radicals interconnected by disulfide groups. Such solid polymers can be split by processes disclosed in Patent 2,466,963 to form liquid polymers having viscosities within the range 300 to 100,000 centipoises.

While a wide variety of such liquid polymers can be prepared, the polymers that are presently of commercial importance fall within a somewhat more limited group. The commercially important liquid polymers are particularly described in articles by Fettes and Jorczak published in "Industrial and Engineering Chemistry," volume 42, page 2217 (1950) and volume 43, page 324 (1951). As pointed out in these published articles, the commercially available liquid polymers are generally prepared from bis(betachloroethyl) formal and are essentially composed of chains of recurring $(S \cdot CH_2 \cdot CH_2 \cdot O \cdot CH_2 \cdot O \cdot CH_2 \cdot CH_2 \cdot S)$ units having free mercapto terminals at the ends of the chains through which they can be oxidatively cured to form solid elastomers. In the manufacture of these commercial polymers a small percentage of trichloropropane is commonly mixed with the bis(betachloroethyl) formal to provide a degree of cross-linking, say 0.5% to 2.0%, as mentioned above. These commercial liquid polymers commonly have molecular weights within the range 1000 to 5000.

While a great many curing agents have been proposed for curing such polysulfide compositions, in general these curing agents have to be mixed with the polysulfide composition just prior to use in order to avoid premature solidification of the composition. Hence it has been customary to supply the sealant composition in two packages, one of which contains the fluid polysulfide-base composition and the other of which contains the curing agent. The requirement that the sealant composition be incorporated in two packages imposes a serious limitation on its utility, particularly in cases where the product is sold in small quantities at the retail level. For retail distribution a two-package product is undesirable both because of customer sales resistance and also because unskilled users may fail to follow the mixing instructions accurately and thereby achieve an unsatisfactory coating or seal.

The problem of producing a one-package polysulfide-base sealant that will remain stable in storage for an indefinite period of time and will also cure acceptably after it has been applied to the surfaces to be sealed has proved to be a difficult one to solve. One previously proposed single-package sealant composition is disclosed in Smith Patent No. 2,940,958. In accordance with the disclosure of the Smith patent, the polymer is mixed with a water-activatable curing agent and a hydrated salt. So long as the composition is kept at low temperature, it remains stable. When the composition is heated, the water of hydration of the hydrated salt is released and activates the curing agent to cause the composition to cure to an elastomeric form.

While such a one-package polysulfide sealant composition is satisfactory for some applications, it is also subject to certain undesirable limitations. For example, in many cases it is desired to use the sealant composition in environments which cannot readily be heated to bring about a cure of the sealant composition. Also many of the hydrous salts begin to release water of hydration at about 100° F., and hence compositions of this type become somewhat unstable in southern latitudes or in temperature latitudes at midsummer temperatures. Since the polysulfide polymers are rather viscous, it is convenient to carry out the compounding of the compositions at a temperature somewhat above room temperature. However, an elevated temperature mixing procedure cannot very well be used when hydrated salts are employed as a component of the mixture. A further disadvantage of the compositions containing hydrated salts is that they impose serious limitations on cure rate. If it is necessary to slow down the cure rate as required for certain caulking applications, this can be accomplished by reducing the amount of hydrated salt present. However, such a reduction in the amount of hydrated salt products a product with relatively poor physical properties.

It is accordingly an object of the present invention to produce a one-package polysulfide coating and sealing composition which remains stable when stored at atmospheric temperatures for an indefinite period of time, and which, when used for coating or sealing applications after an extended storage period, readily cures to provide a rubbery seal or coating having good physical and chemical properties. It is another object of the invention to provide a polysulfide sealant composition having a curing agent which remains inert when the composition is in a sealed container but is activated on exposure to either atmospheric oxygen or water to produce a cure of the polysulfide polymer. It is a further object of the invention to provide a polysulfide sealant composition having a curing agent admixed therewith which in the absence of water and free oxygen remains inactive over a relatively wide temperature range. It is still another object of the invention to provide a polysulfide sealant composition that can be compounded to permit selective control of curing rates to achieve acceptable cures over curing periods of a few minutes to several months, as desired. It is still another object of the invention to provide a polysulfide sealant composition which when exposed to atmospheric air or water rapidly develops an essentially tack-free film over its exposed surfaces with a slow cure of the liquid core material. Other objects of the invention will be in part obvious and in part pointed out hereafter.

The objects and advantages of the present invention may be achieved in general by mixing with a liquid polythiopolymercaptan polymer a complex curing catalyst or curing agent which remains inactive toward the polysulfide polymer in the absence of water and free oxygen but which upon exposure of the composition to water or atmospheric air is activated to cure the polymer. Thus as long as the present compositions are packaged in an airtight container substantially free from moisture and free oxygen, they remain stable for an indefinite period of time. When the container is opened and the composition is applied to a surface to be sealed or coated under such conditions that it is exposed to atmospheric air or water, curing of the polymer in the composition is initiated at a rate that depends in large part upon the amount of catalyst complex and the relative proportions of the catalyst components present. As indicated above, by varying the specific nature of the catalyst components, the amount of catalyst used and the relative proportions of the catalyst components, the period of cure can be varied over a relatively wide range of a few minutes to several months.

In general the present compositions can be used for all of the purposes for which the prior two-package polysulfide compositions have been used, e.g., caulking, sealing, potting, coating, impregnation of porous materials and the like. Like the prior two-package polysulfide compositions, they produce cured materials that adhere tenaciously to clean surfaces of wood, glass, metal, building materials, plastics, leather, fabrics, and other porous substances. They also exhibit the well-known physical and chemical properties of cured polysulfide polymers such as elasticity, tensile strength, and low permeability to gases, as well as resistance to degradation from sunlight, atmospheric oxidation, acids, solvents, and oils.

The curing catalyst of the present invention comprises two principal components, namely, a metal soap and a chelating agent. Both the metal soap and chelating agent are preferably employed in solution in an inert organic solvent to facilitate their dispersion in the polymer composition. The metal soaps useful in the present compositions comprise those that have previously been employed as driers in paint mixtures and include the naphthenates, octoates, and tallates of cobalt, manganese, iron and lead and mixtures of such metal soaps. Any of various commercially available solvent solutions of these soaps, which commonly contain from 5% to 25% by weight of metal, may be used satisfactorily. The amount of metal soap used in the present compositions varies as a function of the curing rate desired. Usually the quantity of soap is such as to provide from 0.1% to 0.6% by weight of metal based on the weight of the polymer. The gross weight of the soap incorporated in the composition is usually from about 0.2% to about 4% by weight of the polymer.

The chelating agents used in the present compositions are oil-soluble amines or diamines of a type known to be useful in the sequestration of metals by forming complexes therewith. Certain chelating agents previously proposed as deactivators in paint and petroleum compositions have been found especially effective in the present compositions. For example, it has been found that a commercial chelating agent sold under the trade name "ACTIV-8" and comprising 38% by weight of 1,10-phenanthroline, 52% of normal butyl alcohol and 10% of 2-ethylhexoic acid, when incorporated in a polysulfide composition with a metal soap as described herein, produces a slow-curing, fast-skinning composition useful for many sealant applications. Another chelating agent that produces acceptable curing activity when compounded with a metal soap in the present compositions is sold under the trade designation "MDA" and consists essentially of 80% of N,N'-disalicylidene-1,2-diaminopropane and 20% of toluene.

Such chelating agents perform the important function of stabilizing the present compositions against the premature curing that would occur if the metal soap is used alone. They also tend to increase the curing rate of the composition when it has been applied to surfaces to be coated or sealed and thus exposed to atmospheric oxygen or water. The quantity of chelating agent used varies as a function of the amount of metal soap and it is preferably used in such an amount as to provide a weight ratio of chelating agent to metal in the metal soap of from about 2:1 to 10:1, i.e., from about 0.2% to 6% of the polymer weight. In general, an increase in the ratio of chelating agent to metal soap produces a longer period of stability, faster cures and superior physical properties of the cured product. The preferred catalyst complex comprises cobalt naphthenate as the metal soap and 1,10-phenanthroline as the chelating agent.

In addition to the polymer and catalyst complex, the present compositions may contain a variety of special purpose ingredients all as is well known in the prior art. Thus the compositions may be compounded to include ingredients such as fillers, reinforcing agents, pigments, tackifiers and the like. As indicated in the following examples, the present compositions may also include a minor proportion of phenolic resin to improve adhesion to substrate surfaces and a small amount of stearic acid which in the present compositions is used primarily to reduce tackiness of the surfaces exposed to the curing environment.

Since the curing catalysts used in the present compositions are activated by oxygen, it is important that compounding of the present compositions be carried out in an oxygen-free atmosphere and that the compositions be maintained in such an atmosphere until they are used. A typical and illustrative procedure for preparing the compositions described in the examples given below is as follows: Mixing is effected in a Bake-Perkins sigma mixer having a 0.7 gallon capacity and equipped with connections to suitable vacuum and pressurizing sources. The polymer is placed in the mixer and a blend of the compounding ingredients other than the curing catalyst added thereto. Mixing of the liquid polymer and subordinate compounding ingredients is continued for about fifteen minutes after which the mixer is placed under a 15 to 20-inch vacuum. The curing catalyst comprising a mixture of metal soap solution and chelating agent solution is then added to the mixer. Mixing is continued for about 2 hours under vacuum to remove oxygen occluded in the polymer and the compounding ingredients, as well as from the atmosphere within the mixer above the mix. During this two-hour period the solvent associated with the curing catalyst evaporates. At the end of the two-hour period of mixing, nitrogen or other inert gas is introduced into the mixer to fill the free space above the mixture to a pressure 5 to 10 p.s.i. gauge. Mixing of the batch is terminated about a half hour after the introduction of the inert gas into the mixer.

Compositions as thus prepared can be packaged in collapsible metal tubes or rigid containers, as desired. When proper precautions are taken to exclude moisture and oxygen from the container, these compositions are characterized by outstanding long-term stability. Storage temperatures may vary from −20° to +160° F. Without activating any noticeable cure. Also specimens have been stored in metal tubes at 75°±20° F. for more than a year and a half and at 120° F. for more than a year without any significant curing. In case where the compositions are packaged in collapsible tubes, metal tubes are preferred over plastic tubes because the former are more nearly impervious to moisture and atmospheric oxygen. Such collapsible tubes provide a convenient method of applying the composition to cracks or crevices that are to be sealed therewith.

As indicated above, curing of the present compositions after their application to substrate surfaces is activated by either air or water. The curing process is characterized by relatively rapid development of an essentially tack-free film or skin which toughens with age and by a relatively slow polymerization of the liquid material beneath the skin. The time required to develop this external skin is generally proportional to the period of time required for complete cure. Some skins develop almost instantly while others take as long as 48 hours or more. The external skin developed by the present compositions provides a degree of protection to the underlying fluid material. If the skin is accidentally ruptured, a new skin forms rapidly, that is, the skin is "self-healing." Also the skin changes color as the cure proceeds and hence provides an experienced observer with an indication as to the extent to which the cure has proceeded.

The curing period may be selected from within a range of minutes to several months and depends upon such factors as the choice of metal soap and chelating agent used to prepare the catalyst complex, the quantity and composition of the catalyst, the kind of curing environment, e.g., air or water, the ambient temperature during curing and the ratio of exposed area of the seal to the mass of composition used therein. Factors which tend to increase the curing rate are the use of a relatively high percentage of metal soap in relation to the quantity of polymer, the use of water rather than air as an activating agent, the employment of higher ambient temperatures up to about 220° F. and the use of a high ratio of exposed area to mass, e.g., the application of the composition in relatively thin layer or coating. Films 5 to 10 mils thick cure within 0.5 to 1.5 hours.

In order to point out more fully the nature of the present invention, the following specific examples are given of illustrative embodiments of the invention. In these examples the polysulfide polymers employed are designated as LP-32 and LP-33. The polymer identified as LP-32 is a liquid polysulfide polymer having molecular chains composed of the recurring units $$(SC_2H_4 \cdot O \cdot CH_2 \cdot O \cdot C_2H_4S)$$

with mercapto terminals at the ends of the chains. Its average molecular weight is 4,000 and it has a viscosity of 350 to 400 centipoises at 25° C. The method of manufacture of this polymer has been outlined above and is disclosed in Patent No. 2,466,963. In its manufacture about 0.5% of trifunctional material is used to produce a slight degree of cross-linking.

LP-33 is similar to LP-32, except that it has an average molecular weight of about 1,000 to 1,200.

In the following examples, physical data such as tensile strength, elongation and hardness are average values determined in accordance with standard ASTM methods. Unless otherwise noted, the physical properties were determined on pressed-out, heat-cured specimens subjected to accelerated aging at 160° F. for ten days. Quantities are given in parts by weight.

EXAMPLE 1

Several curable polysulfide compositions were prepared using LP-32 liquid polysulfide polymer, 1,10-phenanthroline as the chelating agent and several metal soaps as indicated below. The compositions were prepared by hand mixing for several minutes at room temperature. The chelating agent was added in the form of the solvent solution referred to above (ACTIV-8) and the quantity of 1,10-phenanthroline used was 1.14 parts by weight per 100 parts of polymer. The metal soaps were also added in solvent solution in amounts to provide 0.3 part of metal per 100 parts of polymer. Thus the ratio of chelating agent to metal in the soap was about 4:1.

Aliquots of each of these formulations were stored in closed containers at room temperature for about three months. Essentially no signs of thickening were observed, thus indicating that these formulations have extended package stability.

Each of these formulations was cured by placing a sample thereof in a shallow container exposed to the atmosphere. 50-gram samples were used and distributed in such manner that a 2-inch diameter surface was exposed to the atmosphere. A tack-free skin developed over a liquid core, and the entire mass later cured to a soft, pliable elastomer. The curing times and initial color of these formulations were as indicated in Table I.

*Table I*

| Metal Soap | Curing Time | | Initial Color |
|---|---|---|---|
| | Skinning, Hours | Complete, Months | |
| Cobalt Naphthenate | 16-20 | 1 | Dk. Brown. |
| Manganese Naphthenate | 36-48 | 2-3 | Tan. |
| Iron Naphthenate | 36-48 | 3 | Dk. Red. |
| Lead Naphthenate | 48-72 | 3 | Black. |
| Cobalt Tallate | 20-24 | 2-3 | Dk. Brown. |
| Cobalt Ethylhexoate | 24-36 | 2-3 | Dk. Brown. |
| Manganese Ethylhexoate | 36-48 | 4-5 | Amber. |

The foregoing data indicate that a fairly wide range of curing times can be achieved by varying the nature of the metal soap used. In general, the cobalt soaps produce a faster cure, and among the cobalt soaps the naphthenate produces the fastest cure. It has been found that the tallates of manganese, iron, and lead and the ethylhexoates of iron and lead, when employed in formulations of the type described herein, have curing properties generally similar to those given in Table I.

The initial colors of the formulations of this example as listed in Table I tend to become lighter as the cure proceeds. As has been previously pointed out, this color change can be used as an indication of the degree to which the cure has proceeded. The color of the present compositions can of course be modified by addition of pigments thereto in known manner.

EXAMPLE 2

A number of liquid polysulfide-base compositions were prepared containing various subordinate compounding ingredients as indicated in Table II. In Table II Calcene TM is the trade name of a calcium carbonate filler; Titanox AMO identifies a titanium oxide reinforcing agent; and Durez 10694 identifies a phenolic resin used to improve the adhesive quantities of the composition. Stearic acid was used to detackify exposed surfaces of the composition situated in the cure environment. The cobalt was added to the compositions in the form of cobalt naphthenate in a solvent solution of 6% metal content and the chelating agents were added in the form of commercial products identified as ACTIV-8 and MDA.

Curing was effected under atmospheric conditions at room temperature. Since all specimens, including the control sample, had exposed area-to-mass ratios less than those of Example 1, the cure rates of Table II are somewhat lower than those of Table I.

Table II

| Ingredients | Specimen | | | | | |
|---|---|---|---|---|---|---|
| | Control | A | B | C | D | E |
| LP-32 Polymer | 100 | 100 | 100 | 100 | 100 | 100 |
| Calcene TM | 30 | 30 | 30 | 30 | 30 | 30 |
| Titanox AMO | 10 | 10 | 10 | 10 | 10 | 10 |
| Durez 10694 | 4 | 4 | 4 | 4 | 4 | 4 |
| Stearic Acid | 1 | 1 | 1 | 1 | 1 | 1 |
| Cobalt | | 0.3 | 0.1 | 0.6 | 0.3 | 0.3 |
| 1,10-phenanthroline | | 1.25 | 0.38 | 1.14 | 2.28 | |
| Disalicylidene diaminopropane | | | | | | 1.2 |
| Sodium Chromate (Anhydrous) | 10 | | | | | |
| Ferric Chloride | 0.25 | | | | | |
| Ratio of chelate to curing metal | | 4:1 | 4:1 | 2:1 | 8:1 | 4:1 |
| Skinning time | 72 h. | 20 h. | 84 h. | | 16-20 h. | |
| Complete cure time | 7 d. | 1 mo. | | 16-20 h. | | |

The foregoing data show that an increase in metal content increases the cure rate. In the case of specimen E, curing started while the ingredients were being mixed, thus indicating that the MDA chelating agent promotes an exceptionally fast cure.

A sample of specimen A immersed in water cured faster than the air-cured sample of Table II.

EXAMPLE 3

A number of liquid polysulfide compositions were formulated as indicated in Table III. The ingredients used were the same as in Example 2 except that certain other metal soaps were used and in the case of specimen C, phenolic micro-balloons were included in the formulation to fortify both elongation and hardness properties. The ingredients and their respective amounts used in each formulation are tabulated below.

Table III

| Ingredients | Specimen | | | | |
|---|---|---|---|---|---|
| | Control | A | B | C | D |
| LP-32 Polymer | 100 | 100 | 100 | 100 | 100 |
| Calcene TM | 30 | 30 | 30 | 30 | 30 |
| Titanox AMO | 10 | 10 | 10 | 8.72 | 10 |
| Durez 10694 | 4 | 4 | 4 | 4 | 4 |
| Stearic Acid | 1 | 1 | 1 | 1 | 1 |
| Phenolic Microballoons | | | | 8.75 | |
| Cobalt (used in the form of a naphthenate solution) | | 0.3 | | 0.3 | 0.3 |
| Cobalt (used in the form of an octoate solution) | | | 0.2 | | |
| Manganese (used in the form of a naphthenate solution) | | | 0.3 | | |
| 1,10 phenanthroline | | 1.25 | .75 | 1.25 | |
| Sodium Chromate (anhydrous) | 10 | | | | |
| Ferric Chloride | 0.25 | | | | |
| Physicals: | | | | | |
| Tensile Strength, p.s.i. | 220 | 385 | 370 | 245 | 105 |
| Percent Elongation, at T.S. | 650 | 580 | 505 | 675 | 80 |
| Shore Hardness | A30 | A36 | A36 | A40 | A22 |

It will be observed that specimens A, B and C have superior qualities in respect to both the control specimen and specimen D formulations. These superior properties are attributable to the presence of the curing catalyst complex which also causes increased curing activity. The importance of the chelating agent is best demonstrated by the poor showing of specimen D, wherein this agent was omitted, as compared to the results achieved with A. Specimen D also showed package instability after two months storage in a tube at room temperature.

Samples of specimens A, B and C were observed over extended periods of time after being placed in collapsible metal tubes and subjected to a varying ambient temperature. Each of them exhibited long-term package stability. However, specimen A, a preferred caulking and sealing composition, proved to be outstanding in this respect as evidenced by the fact that essentially no curing occured in tubes stored at room temperature for a period of about 1½ years, nor at 120° F. for about 1 year, nor at 160° F. for 10 days. Material expressed from the tubes after these periods cured essentially in the same manner and had substantially the same properties as specimen A of Table III.

EXAMPLE 4

A curable polysulfide polymer composition was prepared like specimen A of Example 3 except that LP-33 polymer was substituted for LP-32 polymer. The resulting composition was highly stable and cured satisfactorily upon exposure to the atmosphere at about 70° F. A tack-free skin developed after about 6 weeks exposure and the material cured to an elastomer in about 4 months.

EXMPLE 5

A curable copolymer composition was prepared like specimen A of Example 3 except that a mixture of 90 parts LP-32 polymer and 10 parts LP-33 polymer was used in lieu of 100 parts of LP-32. All other ingredients were as stated in Example 3. A brown, highly stable, liquid polysulfide composition resulted which cured upon exposure to the atmosphere at about 70° F. A light brown tack-free skin developed after about 16 to 20 hours exposure, and a pliable, thoroughly cured elastomer resulted about 12 weeks later.

From the foregoing description and examples it should be apparent that the present invention provides a one-package polysulfide sealant having exceptional shelf stability and diverse sealant properties. It may be used with advantage for filling reflection cracks in highways and other concrete structures, making gas-tight seals in electrical conduits, and for various structural sealant purposes such as flashings around chimneys, roofs and window frames. The curing pattern of the present products is advantageous where the products are applied to somewhat irregular surfaces. In such cases because of the relatively high viscosity of products of the present type they may not initially flow into small depressed areas of the irregular surface. As pointed out above, the present products tend to form a skin at the exposed surface within a relatively short period of time and cure from the exposed surface in. Thus it is possible after application of the adhesive and formation of the surface skin, to redistribute the underlying fluid material, either by the application of light pressure or by vibration of the substrate, to ensure complete wetting of the irregular surface of the substrate by the fluid sealant. In this way improved adhesion is achieved.

It is of course to be understood that the examples given herein are illustrative only and that numerous changes can be made in the ingredients, proportions and conditions set forth therein without departing from the spirit of the invention as defined in the following claims.

We claim:

1. An airtight container containing a one-package polysulfide coating and sealing composition comprising a substantially water-, oxygen- and solvent-free mixture of liquid polythiopolymercaptan polymer having a molecular weight of 500 to 25,000 and a water and oxygen activatable curing catalyst complex, said complex being essentially composed of a metal soap selected from the group consisting of the naphthenates, octoates, and tallates of cobalt, manganese, iron and lead and an oil-soluble amine chelating agent selected from 1,10-phenanthroline and N,N'-disalicylidene-1,2-diaminopropane.

2. An airtight container containing a one-package polysulfide coating and sealing composition comprising a substantially water-, oxygen- and solvent-free mixture of liquid polythiopolymercaptan polymer having a molecular weight of 500 to 25,000 and a water and oxygen activatable curing catalyst complex, said complex being essentially composed of a metal soap selected from the group consisting of the naphthenates, octoates and tallates of cobalt, manganese, iron and lead and an oil-soluble amine chelating agent selected from 1,10-phenanthroline and N,N'-disalicylidene-1,2-diaminopropane, the quantity of metal in said soap being from 0.1 to 0.6% by weight of said polymer and the weight ratio of chelating agent to metal in said soap being from 1:1 to 10:1.

3. An airtight container containing a one-package polysulfide coating and sealing composition comprising a substantially water-, oxygen- and solvent-free mixture of liquid polythiopolymercaptan polymer having a molecular weight of 500 to 25,000 and a water and oxygen activatable curing catalyst complex, said complex being essentially composed of a metal soap selected from the group consisting of the naphthenates, octoates, and tallates of cobalt, manganese, iron and lead and a chelating agent which is 1,10-phenanthroline.

4. A composition according to claim 3 and wherein said metal soap is cobalt naphthenate.

5. An airtight container containing a one-package polysulfide coating and sealing composition comprising a substantially water-, oxygen- and solvent-free mixture of liquid polythiopolymercaptan having a molecular weight of 1000 to 5000 and a water and oxygen activatable curing catalyst complex, said complex being essentially composed of from 0.2% to 4% by weight of said polymer of a metal soap selected from the group consisting of the naphthenate, octoate, and tallate of cobalt, manganese, iron and lead and from 0.2% to 6% of a chelating agent which is 1,10-phenanthroline.

6. An airtight container containing a one-package polysulfide coating and sealing composition comprising a substantially water-, oxygen- and solvent-free mixture of liquid polythiopolymercaptan having a molecular weight of 1000 to 5000 and a water and oxygen activatable curing catalyst complex, said complex being essentially composed of from 0.2% to 4% by weight of said polymer of a metal soap selected from the group consisting of the naphthenate, octoate, and tallate of cobalt, manganese, iron and lead and from 0.2% to 6% of a chelating agent which is N,N'-disalicylidene-1,2-diaminopropane.

References Cited by the Examiner
UNITED STATES PATENTS

| | | | |
|---|---|---|---|
| 2,565,897 | 8/1951 | Wheeler | 260—18 X |
| 2,659,691 | 11/1953 | Gislon et al. | 208—207 |
| 2,877,197 | 3/1959 | Fisher | 260—33.2 X |

OTHER REFERENCES

Gobel: vol. 53, Chem. Abstracts, p. 10826a (1959).

Apukhtina et al.: vol. 52, Chem. Abstracts, p. 15111b (1958).

Worthington et al.: "Coordinated Cobalt Soaps as Paint Driers," Paint, Oil and Chemical Review, vol. 112, No. 11, pages 20 and 40–46.

Jorczak et al.: 43 Ind. and Eng. Chemistry, page 326, February 1951.

DONALD E. CZAJA, *Primary Examiner.*

LEON J. BERCOVITZ, *Examiner.*